United States Patent
Merten et al.

[15] 3,642,524
[45] Feb. 15, 1972

[54] PROCESS FOR THE PRODUCTION OF POLYHYDANTOINS

[72] Inventors: Rudolf Merten; Willi Dunwald, both of Leverkusen; Karl-Heinz Mielke, Cologne-Stammheim, all of Germany

[73] Assignee: Farbenfabriken Bayer Aktiengesellschaft, Leverkusen, Germany

[22] Filed: Oct. 24, 1969

[21] Appl. No.: 869,349

[30] Foreign Application Priority Data

Nov. 8, 1968 Germany....................P 18 07 742.4

[52] U.S. Cl.................117/128.4, 117/232, 260/33.4 P, 260/33.8 R, 260/77.5 R, 260/77.5 CH
[51] Int. Cl..........................................................C08g 22/02
[58] Field of Search.............................260/77.5 R, 77.5 CH; 117/128.4

[56] References Cited

UNITED STATES PATENTS 3,397,253  8/1968  Merten et al. .........................260/830
3,448,170  6/1969  Merten et al. .........................260/858

*Primary Examiner*—Donald E. Czaja
*Assistant Examiner*—M. J. Welsh
*Attorney*—Connolly and Hutz

[57] ABSTRACT

Improvement of the process for producing polyhydantoin coatings by heat treating polyhydantoin solutions according to U.S. Pat. Nos. 3,397,253 and 3,448,170 comprising the addition of a metal catalyst, which is soluble in the polyhydantoin solution.

1 Claim, No Drawings

PROCESS FOR THE PRODUCTION OF POLYHYDANTOINS

Processes for the production of polyhydantoin plastics are described in U.S. Pat. No. 3,397,253 dated Aug. 13, 1968 (corresponding to Belgian Pat. No. 678,282); U.S. Pat. No. 3,448,170 filed June 3, 1969 (corresponding to Belgian Pat. No. 700,040) and U.S. Pat. application Ser. No. 617,863 dated Feb. 23, 1967 and now abandoned (corresponding to Belgian Pat. No. 700,041), all of which are incorporated by reference. All these processes are based on the reaction of polyfunctional glycine ester derivatives with polyisocyanates or polyisothiocyanates.

Thus, it is possible in accordance with the above-mentioned processes to react, for example, a compound corresponding to the general formula:

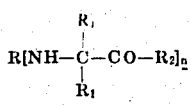

in which:

R represents a $n$-valent aliphatic, aromatic or araliphatic radical, $R_1$ represents hydrogen or an alkyl radical, and $R_2$ represents a hydroxyl group, an amino group, an alkylamino group, dialkyl amino group, alkoxy group or aryloxy group, and $n$ represents 2, 3 or 4, or a compound corresponding to the general formula:

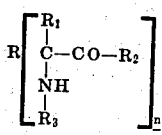

in which R, $R_1$, $R_2$ and $n$ represent the aforementioned radicals while $R_3$ represents hydrogen or an alkyl-, aryl- or aralkyl radical, with a polyisocyanate or polyisothiocyanate to form the corresponding polyurea which is simultaneously or subsequently cyclized.

Accordingly, the basic reaction leading to the polymers may be illustrated, for example, by the equation:

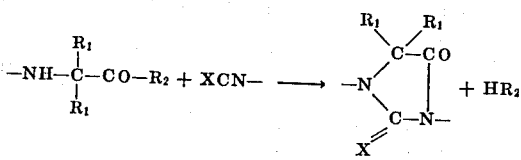

X representing O or S, the remaining radicals being defined as above.

The plastics may be produced both from stoichiometric quantities of polyglycine ester derivatives and polyisocyanate or polyisothiocyanate or the respective precursors, or from a greater or lesser excess of one of the two components. One purpose for which polyhydantoin plastics are used is the production of lacquers. In order to obtain lacquer coatings, it is necessary to start with solutions of the lacquer substance in solvents. With polyhydantoin lacquers, polyhydantions of the highest possible molecular weight are required in order to provide high-grade coatings. Unfortunately, these substances dissolve to form extremely viscous solutions with the result that they have to be highly diluted to give solutions that can be processed. Solvents suitable for this purpose include, for example, phenol, cresol, methylene chloride and trichloroethylene.

These high molecular weight lacquer solutions may be prepared in different ways. A solution of an unbranched polyhydantoin of suitable molecular weight has an extremely high viscosity which makes it difficult to process and necessitates the use of large quantities of solvent (which cannot be recovered). For this reason, it is advisable to build up as much as possible of the high molecular weight structure either simultaneously with or following application to a substrate. As a rule, application of the lacquer solution to the substrate is followed by heat treatment (stoving). In many instances, it is only as a result of this heat treatment that synthesis of the high molecular weight structure is completed. For this purpose, a multistage reaction was proposed (cf. U.S. Pat. application Ser. No. 737,855 filed June 18, 1968 and now abandoned or Belgian Pat. No. 717,709), in which the reaction yielding the high molecular weight plastics material only occurs when the lacquer coating is stoved.

Object of the present invention is the additional use of metal catalysts in the production of polyhydantoin coatings on substrates by heat treatment of polyhydantoin solutions prepared under nonstoichiometric conditions when applied to a substrate.

The heat treatment is generally carried out at a temperature of from 100° to 500° C. for up to 45 minutes.

In a preferred embodiment, a polyglycine ester derivative is condensed with an excess of polyiso(thio)cyanate or masked polyiso(thio)cyanate, and the resulting solution is stoved in the presence of a metal catalyst, the excess of polyisocyanate amounting to from 1 to 50 percent and preferably to from 3 to 20 percent. As can be seen from the reaction scheme shown above, $HR_2$ is split off in the condensation reaction. This agent reacts with the excess of polyiso-(thio)-cyanate so that the isocyanate is not present in free form, but instead is converted into an urethane or an urea. This promotes chain termination which, on the one hand, enables a solution of low viscosity to be prepared and, on the other hand, enables starting materials with a greater or lesser degree of branching to be used.

The following substances are suitable starting materials for producing the polyhydantoin derivatives according to the present invention:

a. As glycine derivatives, the compounds that are described in U.S. Pat. Nos. 3,397,253 and 3,448,170 as well as U.S. Pat. application Ser. No. 617,863 (all of which are mentioned above and are incorporated by reference).

b. Suitable optionally masked polyisocyanates or polyisothiocyanates also include those that are mentioned in U.S. Pat. No. 3,397,253.

In order to modify the properties, it is possible to use additional components, for example polymeric reactive compounds containing OH and NH groups; polyvinyl formals; phenolic resins; polyimides; polyamide imides; polyamides and polyimides containing NCO groups and so on. Examples of compounds containing at least two Zerewitinoff-active hydrogen atoms include polyesters containing at least two OH groups; polyamines; polyamide amines; polyimides and so on containing at least two OH groups; and amino alcohols of the kind described, for example, in Belgian Pat. No. 678,282.

The polyhydantoin solution is prepared as already described in U.S. Pat. No. 3,397,253, by reacting the polyglycine derivative initially introduced in one of the solvents or solvent mixtures mentioned in the aforementioned patent, preferably in phenols and/or cresols, with the optionally masked polyisocyanate, the polyisocyanate being used in excess in a preferred embodiment. Application of the resulting solutions is also described in U.S. Pat. No. 3,397,253, and is now carried out in such a way that stoving is effected in the presence of metal catalysts. It can be assumed that the use of metal catalysts catalyses a secondary reaction involving the derivatives formed from the excess of the isocyanate component. The reaction may be one involving added groups that are reactive with respect to isocyanates, or a secondary reaction involving the isocyanate group which is reformed under the reaction conditions, for example through polymerization to form isocyanurate rings, or condensation reactions to give carbodiimide groups.

Organic and inorganic metal derivatives known per se that are soluble in the reaction mixture may be used as the metal catalysts. It is possible to use, for example, phenolates and alcoholates obtained from metals such as Ba, Ca, Sr, Cd, Zn, Fe, Co, Ni, Cu, Mn, Sn, Pb, Mo, W, Cr, Sb or As, or even chelate complexes, for example, with acetyl acetone, ethyl acetoacetate, benzoylacetone, nitrilotriacetic acid, ethylenediamine tetra-acetic acid, hemiporphyrazine, salicylic aldehyde imines or similar products. Alcoholates in this context means preferably alcoholates of aliphatic alcohols having one to six carbon atoms, including monovalent alcohols, divalent alcohols and polyvalent alcohols. Iron, zinc, lead and cadmium are preferred metals. It is, of course, also possible to use mixtures of different metals.

The properties of the lacquer finishes can be influenced to a considerable extent by the quantity in which the metal salts are added. For example, the degree of cross-linking and hence the resistance to solvents in particular can be increased and improved respectively by adding the metal salts in fairly large quantities. In general, the metal salts will be added in such quantities as to give between 20 and 500 p.p.m. of pure metal, based on the solid product. The metal salts may be added at any time before stoving, i.e., even as early as during condensation between the polyglycine ester derivatives and the polyiso-(thio)-cyanate, although in a preferred embodiment the condensation reaction giving the polyhydantoin is carried out in the presence of extremely small quantities of metal, as the metal is not added until before the application stage.

The practical application of the process and the improvements obtained in the resulting plastics by the addition of metals are illustrated by the following examples.

EXAMPLE 1

Preparation of the starting material: 200 parts by weight of crude N,N'-bis-(dimethylmethoxycarbonylmethyl)-4,4'-diaminodiphenylmethane still containing approximately 8 percent of a corresponding trimer attached through the o-position, are dissolved at 60° C. in 160 parts by weight of phenol and 165 parts by weight of cresol. Following the addition of 0.1 part by weight of endoethylene piperazine, a solution of 133 parts by weight of 4,4'-diisocyanato-diphenylmethane in 67 parts by weight of toluene is added dropwise. Another 600 parts by weight of cresol are added, followed by heating for 6 hours at approximately 200° C., as a result of which the methanol that is eliminated and the toluene solvent both distill off. Following dilution with cresol to a solids content of 15 percent by weight, the resulting 30 percent by weight solution has a viscosity of 1,460 cp. 25° C.

A 30 percent by weight solution of the product is diluted to a solids content of 22 percent by weight with a solvent mixture consisting of a mixture of cresol and xylene in a ratio of 1:9. The resulting solution ready for application as a lacquer has a viscosity of 1,900 cp. at 20° C.

A copper wire 0.7 mm. in diameter is coated with a lacquer in a layer thickness of 0.750 mm. as described in Belgian Pat. No. 678,282. With an average degree of stoving of the lacquered wire, determination of the components soluble in Frigen 22 gives a value of 2.5 percent.

When the wire is aged at 180° C., it can still be wound around its own diameter after 7 days and around two to three times its diameter after 14 days.

If before application iron in the form of Fe-acetyl-acetonate is added to the lacquer solution in a quantity of 100 p.p.m., the following improvements are obtained:

Components soluble in Frigen 22:     0.9%
Windability after ageing at 180° C.:     after 7 days, once φ
                                           after 14 days, once φ

Similar improvements are obtained by the addition of zinc octoate, copper naphthenate and titanium butylate in quantities sufficient to give a metal content of 100 p.p.m., based on the solids content of the solution.

The component soluble in Frigen 22 falls to a value around 1 percent, and the windability after ageing at elevated temperatures increases. If the metal addition is increased to 250 p.p.m., the component extractable with Frigen falls to less than 0.4 percent. Even after ageing for 14 days at 180° C., the wires can be wound around their own diameter without cracking.

Where iron is added in a quantity in excess of 500 p.p.m., a decrease in the initial flexibility is noticeable. This produces a general deterioration in windability, with the result that less favorable results are obtained, even in ageing tests.

Resistance to Frigen is further improved, approaching the regions of minimal extraction in which the accuracy of the method of determination is no longer sufficient to be able to prove the further improvement by way of figures.

When several metals are added at the same time, the same improving effect is obtained for the same overall concentration as indicated above in respect of iron. The addition of 100 p.p.m. of iron, 100 p.p.m. of copper and 50 p.p.m. of lead gives a component soluble in Frigen 22 of 0.3 percent. The wires can still be wound around their own diameter after ageing at 180° C., even after 14 days.

EXAMPLE 2

Following the procedure described in Example 1, a similar somewhat darker colored solution with almost identical viscosity is obtained following the addition of 150 p.p.m. of iron introduced in the form of a solution of iron acetylacetonate in benzene before the isocyanate is added.

A lacquer diluted to a solids content of 22 percent by weight with a mixture of cresol and xylene in a ratio of 1:9 gives a lacquered wire which, in the extraction test, gives 0.8 percent of extract in Frigen 22. If 100 p.p.m. of titanium in the form of titanium butylate and 100 p.p.m. of zinc in the form of zinc octoate are added before lacquering, the extractable component falls to 0.3 percent.

We claim:

1. In the process of coating a substrate with a solution containing a polyhydantoin produced from an excess of a polyisocyanate or a polyisothiocyanate and from a glycine derivative of the formula

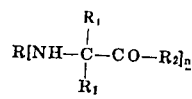

wherein R is an n-valent aliphatic, aromatic or aralphatic radical, $R_1$ is hydrogen or alkyl, $R_2$ is hydroxyl, amino, alkylamino, dialkylamino, alkoxy or aryloxy and n is 2, 3 or 4 or from a glycine derivative of the formula

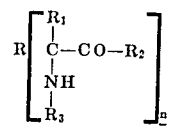

wherein R, $R_1$, $R_2$ and n are as aforesaid and $R_3$ is hydrogen, alkyl, aryl or aralkyl while heating to a temperature between 80° and 500° C., the improvement which comprises carrying out said heating in the presence of a solution soluble phenolate or alcoholate based on Ba, Ca, Sr, Cd, Zn, Fe, Co, Ni, Cu, Mn, Sn, Pb, Mo, W, Cr, Sb or As.

* * * * *